(12) United States Patent
Padget

(10) Patent No.: US 12,111,003 B2
(45) Date of Patent: Oct. 8, 2024

(54) BONDED SLIP JOINT PIPE FITTING

(71) Applicant: Martin Jay Padget, San Marcos, CA (US)

(72) Inventor: Martin Jay Padget, San Marcos, CA (US)

(\*) Notice: Subject to any disclaimer, the term of this patent is extended or adjusted under 35 U.S.C. 154(b) by 0 days.

(21) Appl. No.: 17/942,152

(22) Filed: Sep. 11, 2022

(65) Prior Publication Data
US 2024/0084946 A1 Mar. 14, 2024

(51) Int. Cl.
*F16L 47/02* (2006.01)
(52) U.S. Cl.
CPC .................... *F16L 47/02* (2013.01)
(58) Field of Classification Search
CPC ......... F16L 47/02; F16L 47/04; F16L 37/092; F16L 37/098; F16L 37/0925; F16L 37/105; F16L 37/107; F16L 37/113
USPC .......................................... 285/343, 342, 15
See application file for complete search history.

(56) References Cited

U.S. PATENT DOCUMENTS

| | | | | |
|---|---|---|---|---|
| 381,966 A * | 5/1888 | Story | ...................... | F16L 19/10 285/342 |
| 385,287 A * | 6/1888 | Story | .................. | F16L 37/0925 285/339 |
| 871,607 A * | 11/1907 | Montgomery | ........ | F16L 19/065 285/911 |
| 2,998,269 A * | 8/1961 | Houghton | ................ | F16L 47/02 285/236 |
| 3,195,933 A * | 7/1965 | Jacobs | ..................... | F16L 19/14 285/342 |
| 3,265,412 A * | 8/1966 | Reid | ....................... | F16L 19/08 285/348 |
| 3,548,079 A * | 12/1970 | Wold | .................... | H02G 3/0675 285/915 |
| 3,751,078 A * | 8/1973 | O'Brian | .................. | F16L 21/04 285/348 |
| 4,076,285 A * | 2/1978 | Martinez | ............... | F16L 37/252 285/376 |
| 4,253,686 A * | 3/1981 | Aitken | ..................... | F16L 47/04 285/382.7 |
| 4,508,374 A * | 4/1985 | Kantor | ................. | F16L 19/0283 285/423 |
| 5,543,582 A * | 8/1996 | Stark | ..................... | H02G 3/0675 174/653 |
| 5,600,094 A * | 2/1997 | McCabe | ............... | H02G 3/0616 174/653 |
| 6,089,620 A * | 7/2000 | Mota Lopez | ......... | F16L 37/138 285/322 |

(Continued)

*Primary Examiner* — David Bochna

(57) ABSTRACT

Disclosed is a pipe fitting for making a bonded joint on a pipe comprising a hub, a cap, and a method for bonding the hub to the pipe. The hub has a cone-shaped bore section with an inner diameter at one end similar to the outer diameter of the pipe, expanding to a second diameter. The cap has a protrusion extending along its bore with a leading edge of a diameter larger than the outer diameter of the pipe as well as an inner-trailing edge of diameter similar to the outside of the pipe. Helical ribs on both components allow the cap to be mounted to and tightened against the hub. As the components are assembled onto a pipe, the protrusion on the cap pushes previously applied adhesive under the protrusion and along the pipe, sandwiching adhesive between the pipe and the protrusion, and between the hub and the protrusion.

21 Claims, 6 Drawing Sheets

(56) References Cited

U.S. PATENT DOCUMENTS

| | | | |
|---|---|---|---|
| 6,494,501 B2 * | 12/2002 | Gotoh | F16L 13/103 285/285.1 |
| 7,062,851 B2 * | 6/2006 | Koessler | H02G 15/076 29/857 |
| 7,419,192 B2 * | 9/2008 | Benoit | F16L 19/061 285/291.1 |
| 7,563,993 B2 * | 7/2009 | Drotleff | H02G 15/007 174/653 |
| 2003/0085568 A1 * | 5/2003 | Guest | F16L 37/0927 285/321 |
| 2003/0085575 A1 * | 5/2003 | Crestin | H02G 15/04 285/342 |

* cited by examiner

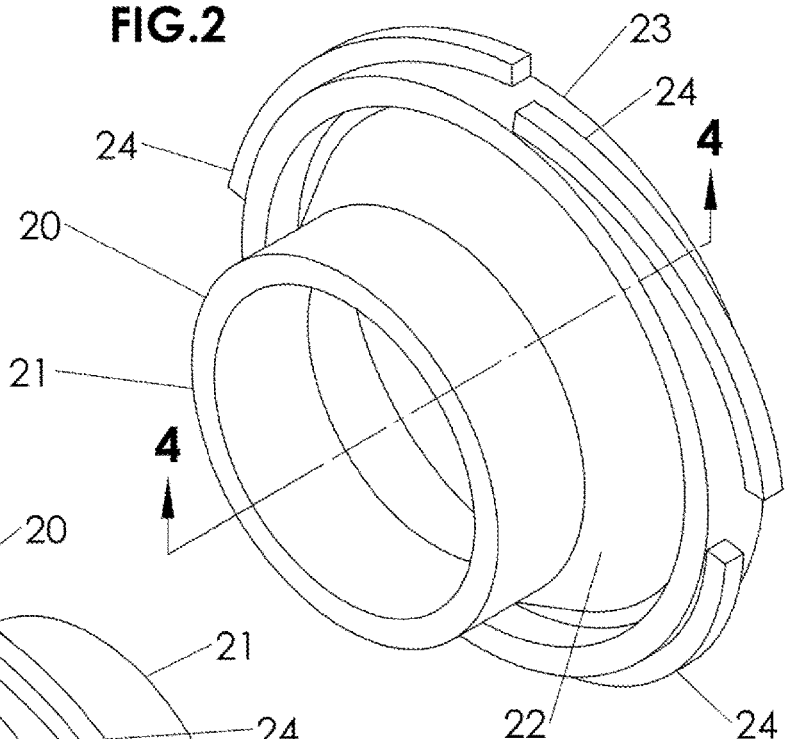
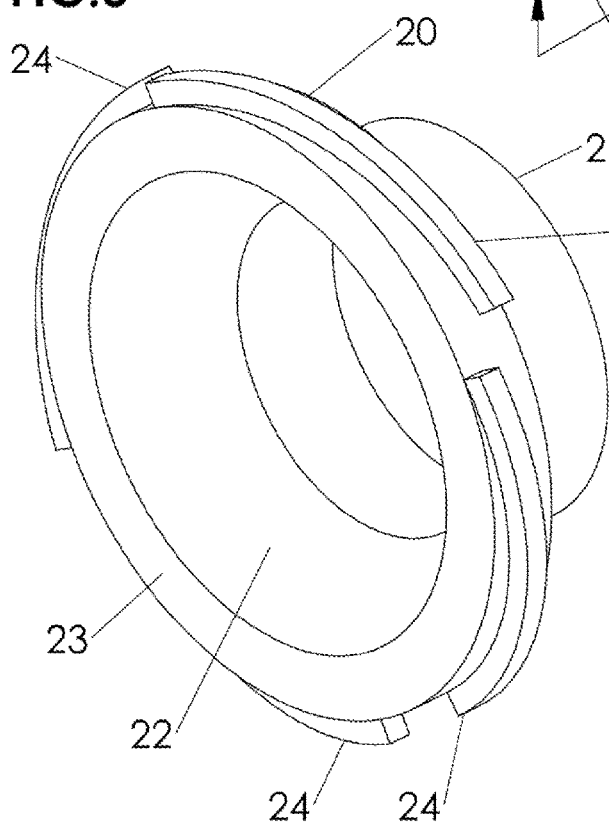
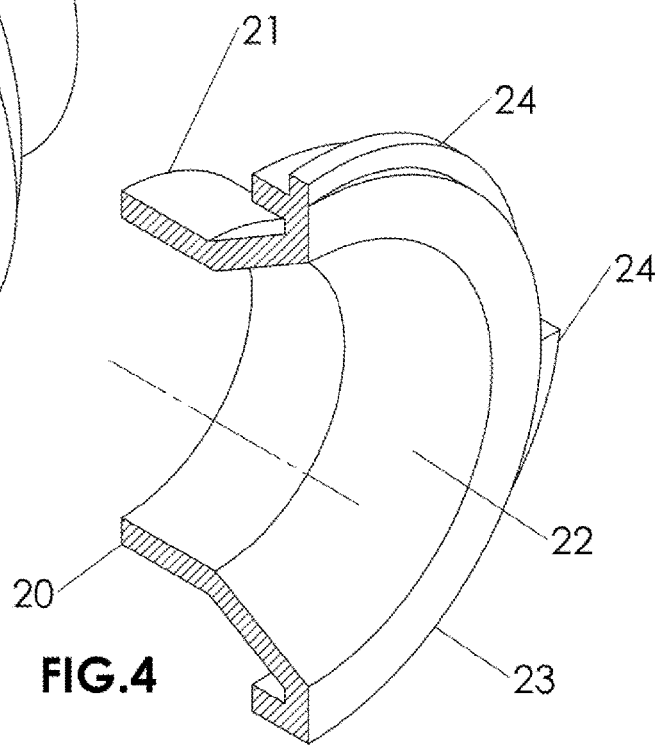

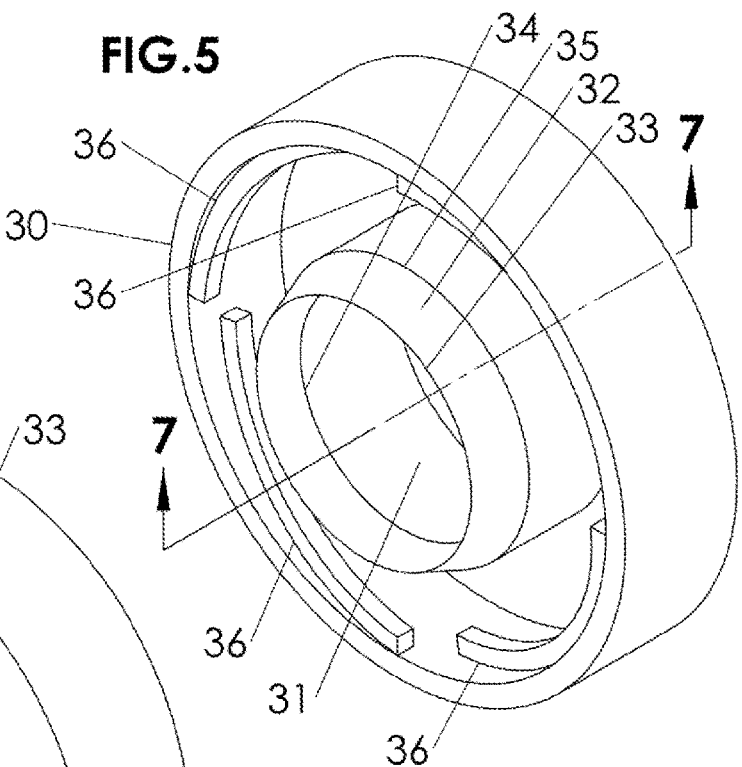
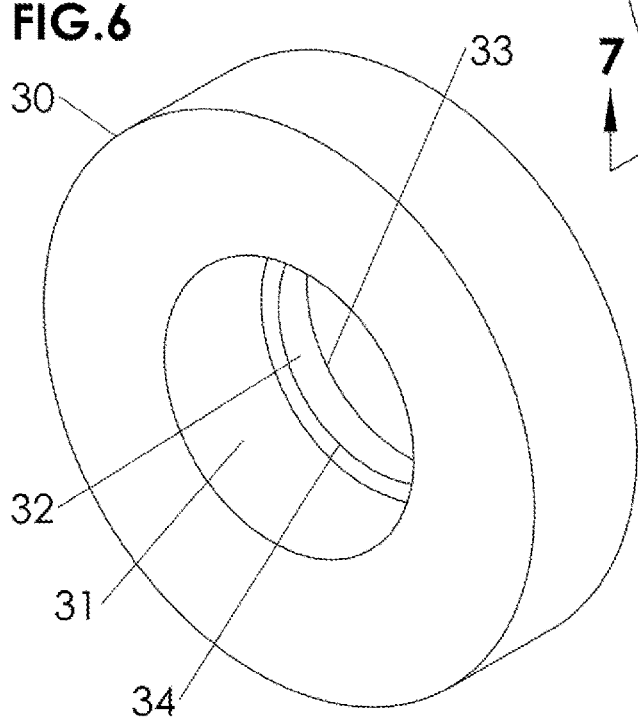
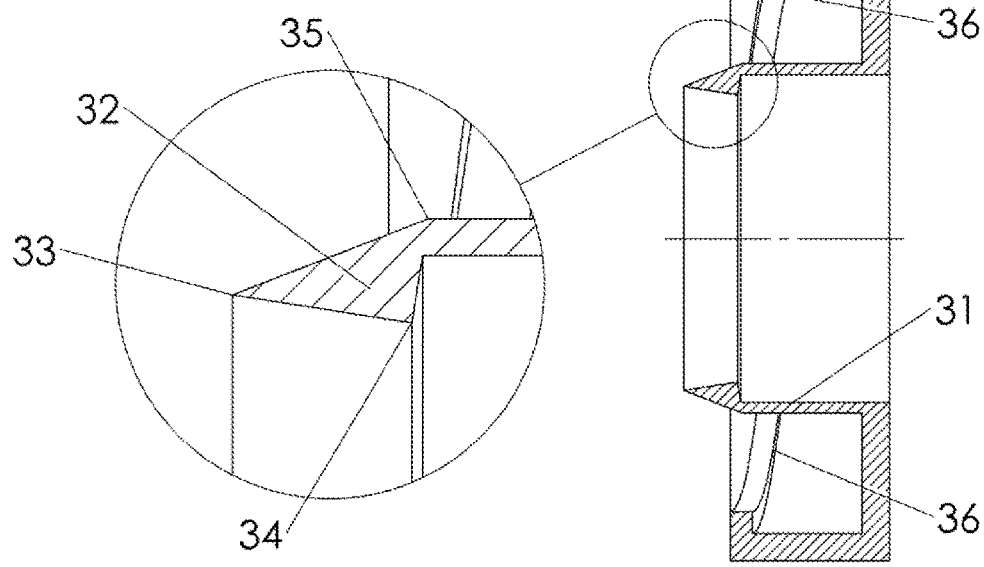

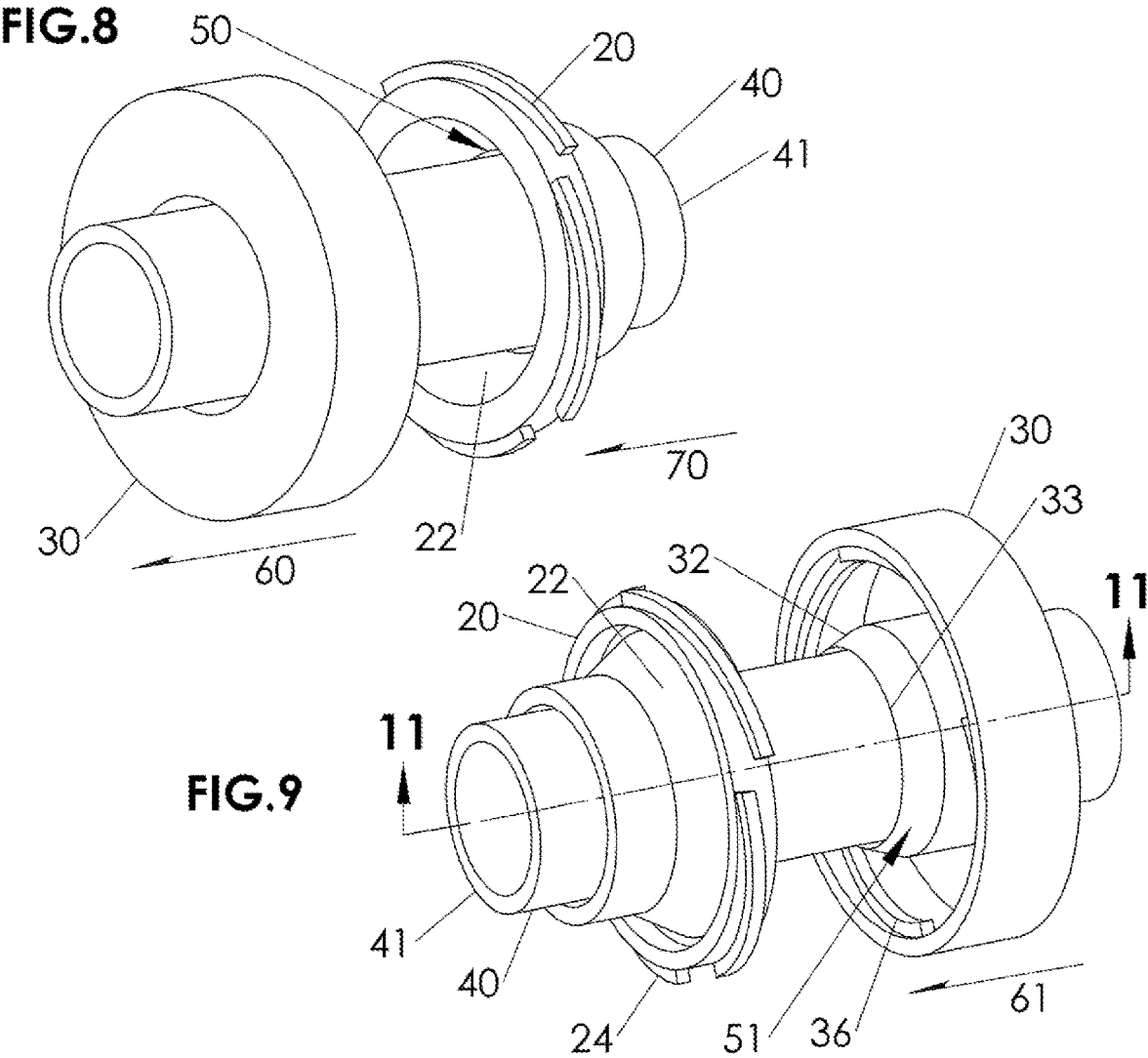
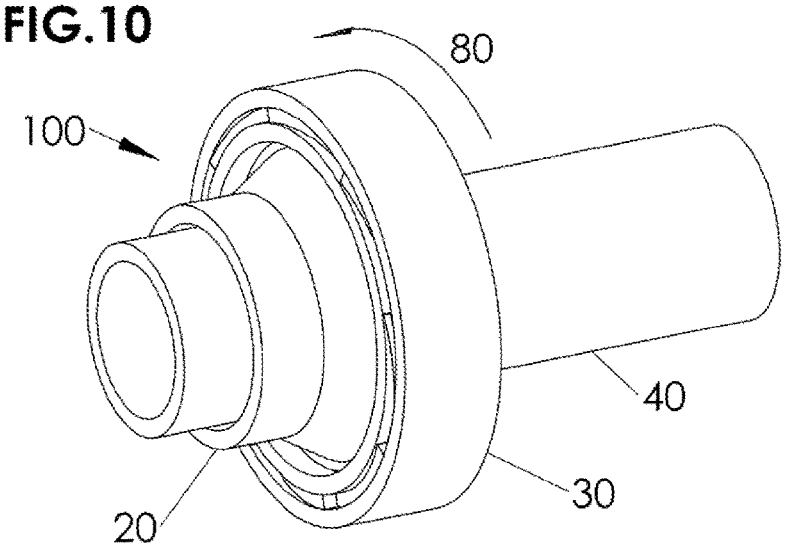

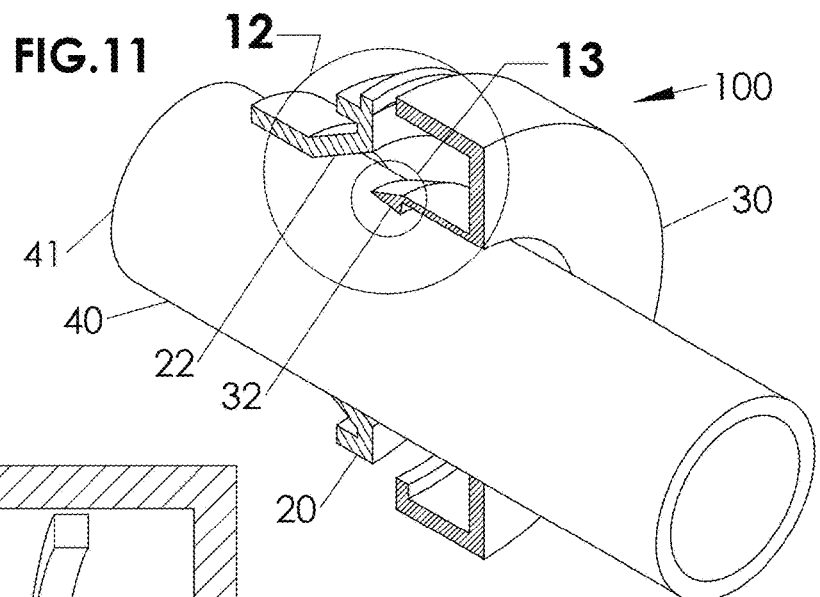
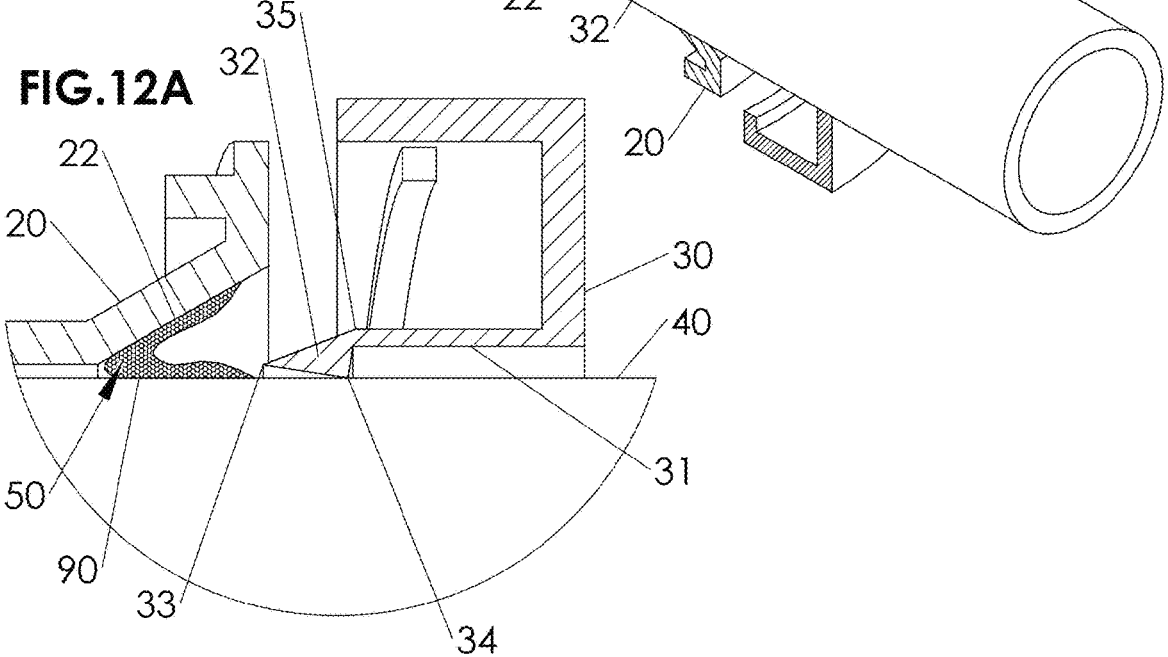
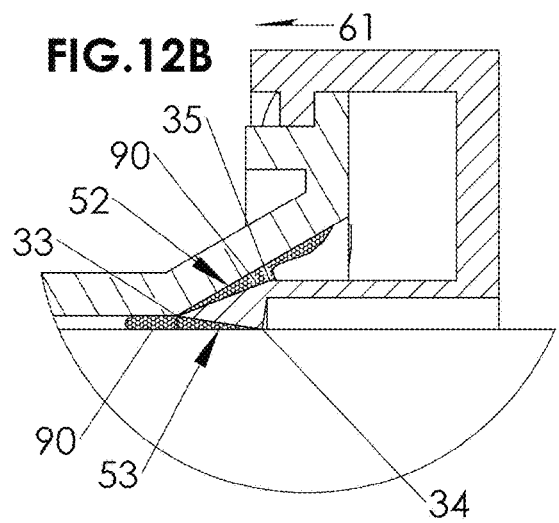
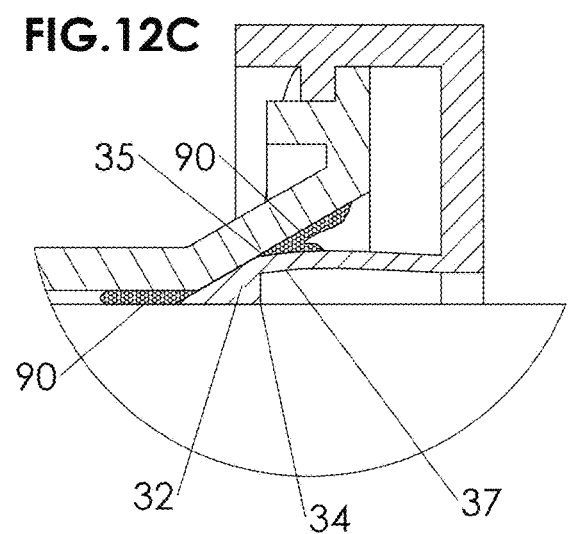

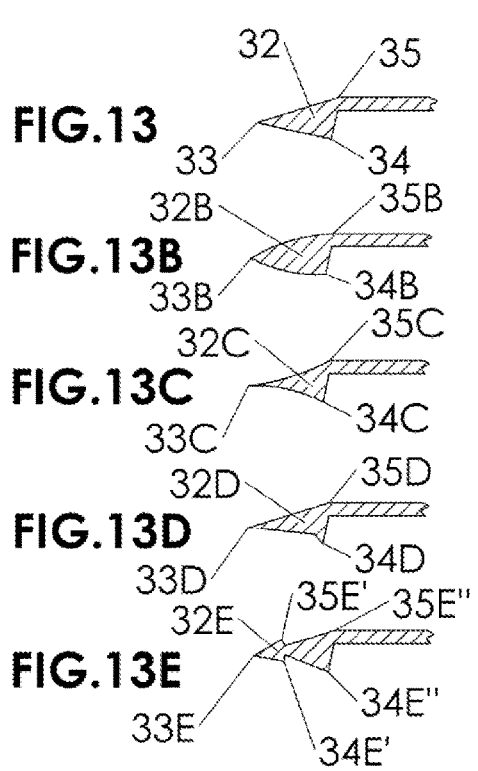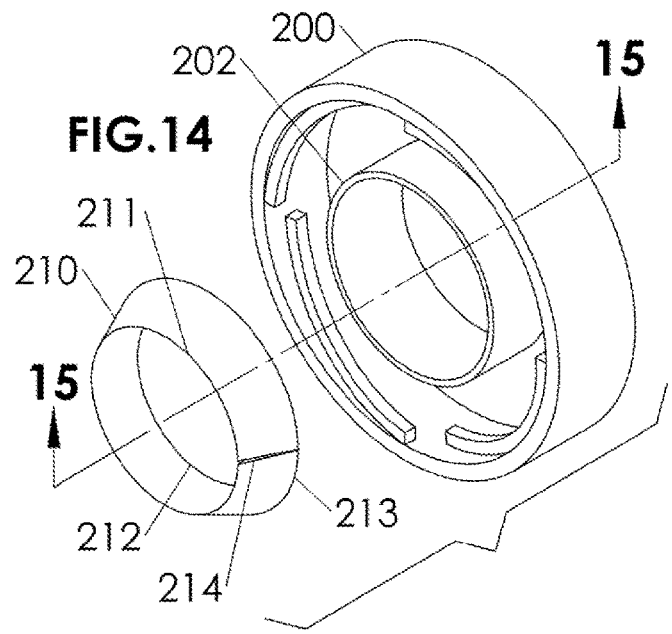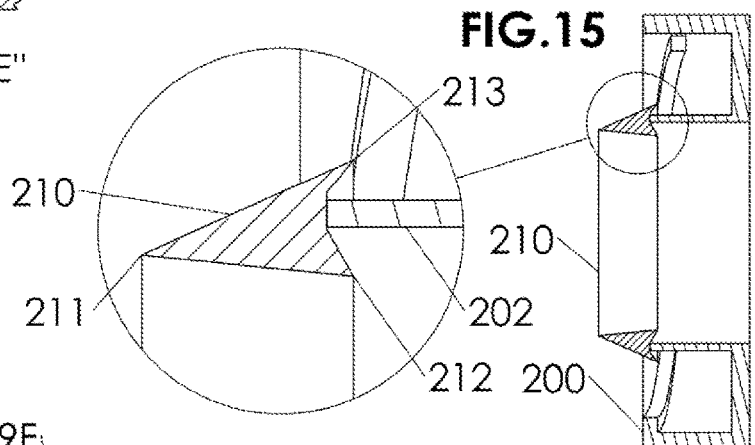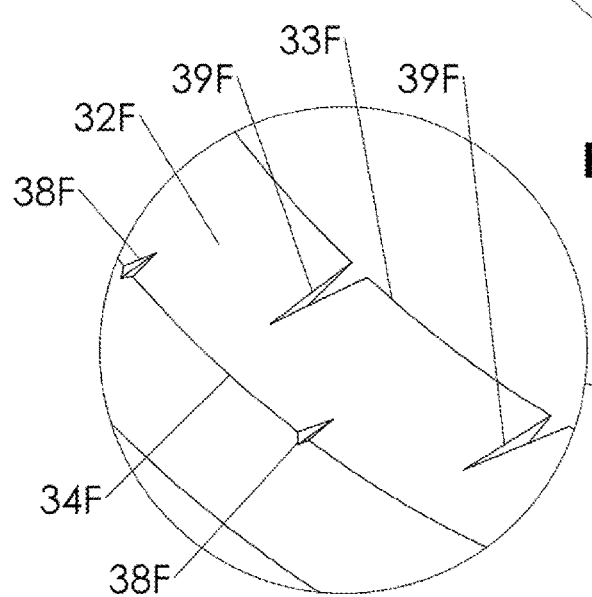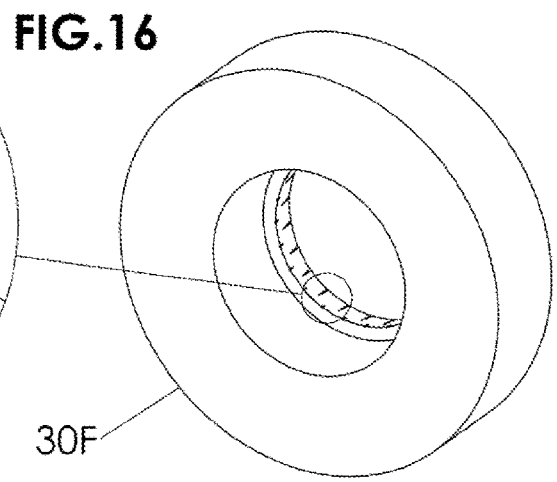

BONDED SLIP JOINT PIPE FITTING

BACKGROUND OF THE INVENTION

The present application is related to pipe fittings and, more particularly, to systems and methods of installing a pipe fitting at any point along the outer surface of a pipe.

Pipe fittings have been designed and installed in a multitude of ways. On the end of a pipe, fittings are often screwed onto an opposing pipe end, usually in conjunction with an adhesive, sealant, or sealing tape. This makes for a robust and leak proof joint. Alternatively, fittings can be welded, fused, or glued to the pipe end. However, these types of pipe joints are limiting in that they can only be made at the end of the pipe. This often requires that pipe lengths are pre-cut exactly as needed, among other drawbacks.

Slip joints and compression fittings are often used to make a joint for a pipe fitting at points along the outer surface of pipe or tube. Typically, these joints utilize a sealing element, such as an o-ring, gasket, compression ring, or ferrule that is pressed simultaneously against the outer surface of the pipe and a surface on the fitting to create a mechanical seal. However, these types of joints are known to be less resistant to failure than bonded or welded joints. These joints can also be difficult to apply if the pipe is not completely clean and free from defects on its outer surface. Furthermore, the sealing element of such joints can often add additional cost to the fitting in production, sometimes substantially.

While it may be possible to add an adhesive or sealant during the installation of a slip joint or compression fitting, it often has little effect on the reliability of the joint as it is difficult to get the adhesive into the locations where it is useful. In some cases, it may be possible to apply adhesive or sealant where it is needed. However, this would likely be a manual process that lacks repeatability, and therefore, reliability. With some slip joints and compression fittings, the use of adhesive or sealants is actually counterproductive as gaps in the adhesive bond create pathways for leakage.

SUMMARY OF THE INVENTION

In view of these and other problems in the art, it is a general object of the present invention to provide a method and apparatus for making an adhesive-bonded joint for a pipe fitting at any point along the outer surface of pipe or tube. Such a joint would have the reliability of a bonded joint while maintaining the ability to placed anywhere along the outer surface of the pipe.

It is a further object of the present invention to provide for an apparatus that allows for a low cost method for manufacture of a slip-joint pipe fitting by eliminating expensive sealing components as well as other extraneous parts commonly found in prior art and on the market.

It is a further object of the present invention to provide a bonded-slip-joint pipe fitting that can be incorporated into a larger overall device.

While the advantages of the invention will likely have broader appeal, the invention has particular use in the repair of broken pipes and specifically with polyvinyl chloride (PVC) and acrylonitrile butadiene styrene (ABS) pipes common in the construction and landscaping industries. A device to fulfill this need could be designed as a tube with a standard socket connection on one end with an embodiment of the present invention on the other. Furthermore, the teachings of this disclosure could be applied to different materials such as other types of plastic, rubbers, or metals. Additionally, devices or fittings with uses other than pipe repair may also make use of this invention.

Essentially, the invention described herein is an improved slip-joint or compression fitting with features that, when used in conjunction with adhesive or sealant, ensure that the adhesive or sealant is distributed into the locations within the joint where is it can be best utilized. The invention comprises:

a. a hub with a tapered bore, the first end of which has a diameter similar to the outer diameter of the pipe with the second end of a larger diameter;

b. a cap with a hole or bore so that it can be slipped over the pipe;

c. a method for securely mounting the cap to the second end of the hub;

d. a method for pushing applied adhesive or sealant into and around the junction of the hub and the pipe as the fitting is installed on the pipe.

This section was meant to provide a general summary of the disclosure and is not a comprehensive recitation of its full scope, utility, or features.

These and other objects and advantages of the present invention, as well as the details of the illustrative embodiments, will become more fully understood from the following descriptions and drawings.

BRIEF DESCRIPTION OF DRAWINGS

The drawings described herein are for illustrative purposes of selected embodiments and modifications to these embodiments. They do not represent all possible implementations of the invention and are not intended to limit the scope of the present disclosure.

FIG. 2 is an isometric view from the distal end of the hub for the disclosed pipe fitting.

FIG. 3 is an isometric view from the proximal end of the hub for the disclosed pipe fitting.

FIG. 4 is an isometric-section view from the proximal end of the hub for the disclosed pipe fitting taken along line 4-4 on FIG. 2.

FIG. 5 is an isometric view from the distal end of the cap for the disclosed pipe fitting.

FIG. 6 is an isometric view from the proximal end of the cap for the disclosed pipe fitting.

FIG. 7 is a side-section view of the cap for the disclosed pipe fitting taken along line 7-7 on FIG. 5 with a detailed view of the protrusion on the cap.

FIG. 8 is an isometric view from the proximal end of the initial stage of installing the disclosed pipe fitting on a pipe.

FIG. 9 is an isometric view from the distal end of an intermediate stage of installing the disclosed pipe fitting on a pipe.

FIG. 10 is an isometric view from the distal end of the final stage of installing the disclosed pipe fitting on a pipe.

FIG. 11 is a partial-isometric-section view from the proximal end taken along line 11-11 on FIG. 9 of installing the disclosed pipe fitting on a pipe FIGS. 12A through 12C are a set of detailed-side-section views taken from circle 12 on FIG. 11 describing three states of the internal workings while installing the disclosed pipe fitting on a pipe.

FIGS. 13 through 13E are a set of detailed-side-section views taken from circle 13 on FIG. 11 describing shapes of the protrusion on the cap.

FIG. 14 is an exploded-isometric view from the distal end of a second embodiment of the disclosed pipe fitting comprising an alternative cap with a separate compression ring.

FIG. 15 is an unexploded-side-section view taken along line 15-15 on FIG. 14 of the second embodiment cap and compression ring for the disclosed pipe fitting.

FIG. 16 is an isometric view from the proximal end of a modified cap for the first embodiment of the disclosed pipe fitting describing notches on the inner-trailing edge as well as notches on the leading edge of the protrusion on the cap.

DETAILED DESCRIPTION OF THE INVENTION

The Preferred Embodiment—FIGS. 1 Through 7

Figure 1:
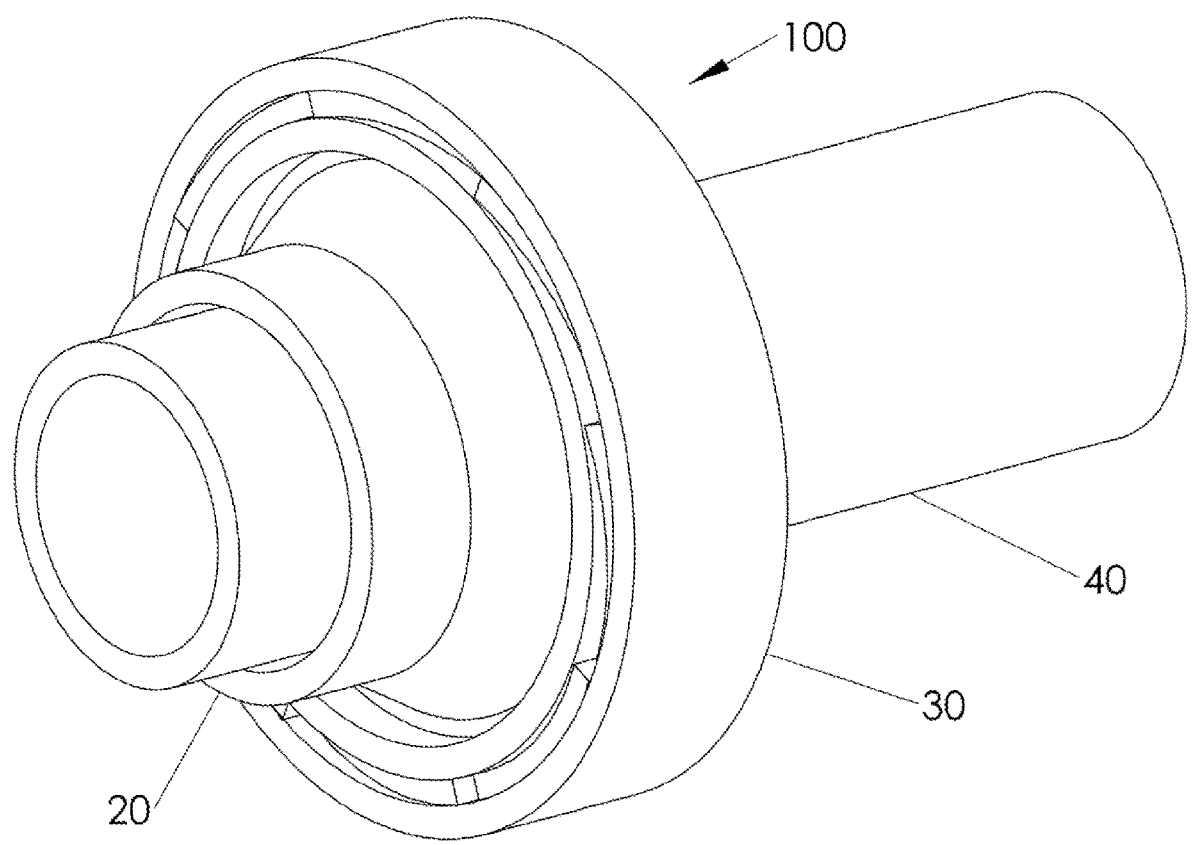
FIG. 1 is an isometric view from the distal end of the disclosed pipe fitting installed over a pipe.

Disclosed is a system and method for creating an adhesive-bonded joint at any point along the outer surface of a pipe employing a novel pipe fitting.

FIG. 1 depicts the preferred embodiment of the fitting 100 installed over a pipe 40. The fitting 100 is comprised of two elements, a hub 20 and a cap 30.

FIGS. 2 through 4 describe the first element of the fitting 100, the hub 20. The first end 21 of hub 20 has an inner diameter sized to the outer diameter of the pipe 40 on which the fitting 100 is to be installed. The inner diameter of the first end 21 may be slightly smaller than the pipe 40 outer diameter creating interference fit with the pipe 40. Alternatively, the inner diameter of the first end 21 may be slightly larger than the outer diameter of the pipe 40 yielding a hub 20 that will slide more easily along the pipe 40. This first end 21 defines the distal end of the hub 20.

Abutting the first end 21 is a transition section 22. The transition section 22 comprises an expanding bore that links the first end 21 to the second end 23 of the hub 20. Thus, the inner diameter of the transition section 22 will become increasingly larger than the outer diameter of the pipe 40 as it approaches the second end 23 of the hub 20.

The second end 23 of the hub 20 has an inner diameter larger than the outer diameter of the pipe 40 by a predetermined amount and would typically carry features meant for attaching the cap 30 to the hub 20. In the present embodiment, these features are shown as a set of helical ribs 24 on the hub 20 that would interlock with a complementary set of ribs on the cap 30.

FIGS. 5 through 7 describe the second element of the fitting 100, the cap 30. The cap has a bore 31 that is sized to fit over the outer diameter of the pipe 40 on which the fitting 100 it to be installed. The diameter of the bore 31 would be large enough to allow the cap 30 to slide over the pipe 40, but a small amount of interference fit could prove advantageous here.

A protrusion 32 surrounds bore 31 and is extruded distally. The protrusion has a leading edge 33 with a diameter larger than the outside diameter of pipe 40 by a predetermined amount. The protrusion 32 also has inner-trailing edge 34 with a diameter that may be slightly smaller than the pipe 40 outer diameter to create an interference fit with the pipe 40, or slightly larger than the outer diameter of the pipe 40 to create a slip fit with the pipe 40. The diameter of the inner-trailing edge 34 must be smaller than the diameter of the leading edge 33 in any case. The protrusion 32 may also have an outer-trailing edge 35 having a diameter larger than the leading edge 33, although an outer-trailing edge 35 is not a required feature.

The cap 30 in the present embodiment has a set of helical ribs 36 corresponding to and meant to interlock with the helical ribs 24 on the hub 20.

Operation—FIGS. 8 Through 12

FIG. 8 shows the first step in installing the fitting 100 over the pipe 40. First, the cap 30 is slid over the open end 41 of pipe 40 in the direction indicated by 60 and past the desired final location for the fitting 100 along the pipe 40. Note the orientation of the cap 30 so that the protrusion 32 points towards the open end 41 of the pipe 40. Next, the hub 20 is slid over the open end 41 of the pipe 40 in the direction 70 oriented so that the interior of the tapered transition section 22 faces towards the cap 30 and the protrusion 32. The hub 20 is pushed along the pipe 40 to the desired final position for installing the fitting 100.

Adhesive would then be applied to the outer surface of the pipe 40 and to the interior of the transition section 22 of the hub 20 about and around the area where these surfaces meet 50.

FIG. 9 is a continuation from the step described in FIG. 8 shown from the distal end. It shows the protrusion 32 of the cap 30 oriented towards the hub 20. Additionally, it shows an optional, secondary location where adhesive may be applied to the surface 51 of the protrusion 32 behind the leading edge 33.

Once adhesive has been applied, the cap 30 is then moved along pipe 40 in direction 61 to meet hub 20. This movement of the cap 30 allows the protrusion 32 to push the previously applied adhesive under the protrusion and into the junction of the hub 20, protrusion 32, and pipe 40. The nature of this action will be described more completely later in this section.

FIG. 10 shows the final step of installing the fitting 100 over the pipe 40. Once the cap 30 has been pushed up to the hub 20 in the step previously described and shown in FIG. 9, the helical ribs 24 on the hub 20 and the helical ribs 36 on the cap 30 are then engaged and tightened against each other by twisting the cap 30 in the direction 80 while holding the hub 20 in place. This causes the protrusion 32 to be forced against the transition section 22 of the hub 20, which, in turn, forces the protrusion 32 down and against the pipe 40. This action sandwiches adhesive between the pipe 40 and the protrusion 32 as well as between the protrusion 32 and the transition section 22 of the hub 20. A detailed explanation of this action is as follows.

FIG. 11 shows a cross section of the hub 20 and cap 30 on the pipe 40 taken along line 11-11 on FIG. 9. The cross section reveals the hidden, inner workings of the disclosed invention involving the protrusion 32 on the cap 30, the tapered-transition section 22 on the hub 20, and the pipe 40.

FIGS. 12A through 12C depict the inner workings of the invention in sequential stages for the last steps of installing the fitting 100 on pipe 40. They are taken from circle 12 on FIG. 11.

FIG. 12A shows the adhesive 90 that was applied in a previous step, described above, at the junction 50 of the pipe 40 and the hub 30. The leading edge 33 of the protrusion 32 is offset from the outer diameter of the pipe 40. The inner-trailing edge 34 rides on or close to the outside of the pipe 40.

FIG. 12B shows the cap 30 moved towards the hub 20, in direction 61, just as the leading edge 33 of the protrusion 32 touches the transition section 22 of the hub 20. As the cap 30 moves into the position shown on FIG. 12B from its previous location in FIG. 12A, the surface of the protrusion 32 between the leading edge 33 and inner-trailing edge 34 directs the applied adhesive 90 on the pipe 40 under the protrusion 32. This motion also causes the inner-trailing edge 34 to push adhesive 90 along the pipe 40 and into junction 50. These simultaneous actions ensure that the space 53 between the pipe 40 and the protrusion 32 is filled with adhesive 90 prior to a final tightening of the cap 30 against the hub 20.

FIG. 12B also shows an optional outer-trailing edge 35 on the protrusion 32 located proximal to and of larger diameter than the leading edge 32. While this feature is not required for operation, it may prove useful as it enables adhesive 90 to better wet the outer surface of the protrusion 32 between the leading edge 33 and the outer-trailing edge 35. The difference in diameters between the leading edge 32 and the outer-trailing edge 35 allows the surface of the protrusion 32 between these two edges to become well wetted with adhesive 90 as the protrusion 32 meets the transition section 22 on the hub 20. This helps to ensure that the space 52 between the hub 20 and the protrusion 32 is filled with adhesive 90 prior to final tightening. Without this mechanism, the adhesive 90 distribution between the hub 20 and the protrusion 32 would solely rely on the geometry of the parts and how well the adhesive 90 is applied. This would likely be an adequate solution, but not necessarily an optimal one.

FIG. 12C depicts the inner workings of the invention after the cap 30 is fully tightened against the hub 20. As the cap 30 is tightened, the protrusion 32 is deforms to fill the space between the transition section 22 of the hub 20 and the pipe 40. This action sandwiches adhesive between the pipe 40 and the protrusion 32 while also sandwiching adhesive between the hub 20 and the protrusion 32. This intimate contact of the protrusion 32 with both the transition section 22 of the hub 20 and the pipe 40 provides an ideal situation for the adhesive 90 to create a large bonding area between these parts. While this action works for all adhesives and sealants, this intimate contact between mating parts is crucial when it comes to solvent bonded joints as the material in the mating parts are literally fused to one another.

In designing the protrusion 32, it may prove to be advantageous to thin out the wall 37 of the protrusion 32 just behind the inner-trailing edge 34. This would create a protrusion 32 that is more flexible and better capable of deforming as required.

It may further prove advantageous to the present embodiment that the angle formed by the surfaces of the transition section 22 of the hub 20 with the outer surface of the pipe 40 be roughly the same as the angle of the distal end of the protrusion 32 at the leading edge 33. When these values are similar, the protrusion 32 needs a smaller amount of deformation to completely fill the space formed by the pipe 40 and the transition section 22 of the hub 20 at their junction 50.

The embodiment presented relies on one or more interlocking helical ribs 24 and 36 on the cap 30 and hub 20 to mount the cap 30 to the hub 20. This design allows for the protrusion 32 to rotate somewhat relative to the pipe 40 as the cap 30 is tightened against the hub 20. This has the effect of smearing the adhesive 90 around the pipe 40 in addition to lengthwise along the pipe 40. This is similar to the technique used in making solvent bonds with polyvinyl chloride (PVC) pipe with standard sockets widely used in the industry. This technique creates a stronger and leak free joint. However, there is no reason why snap features or other methods could not be employed in place of the helical ribs 24 and 36 to affix the cap 30 to the hub 20.

Alternate Embodiment—FIGS. 14 and 15

FIGS. 14 and 15 show an embodiment where the cap 30 is broken into two parts comprising a cap 200 and a compression ring 210. However, the hub 20 and pipe 40 remain as is described in the first embodiment. The cap 200 has many of the same features as the previously described cap 30 but is without an integral sealing feature on the protrusion 202. The sealing function is fulfilled by the ring 210 which likewise has many of the features found on the previously described protrusion 32 including a leading edge 211, an inner-trailing edge 212, and an optional, outer-trailing edge 213. Operation of this second embodiment is much like the first except that the ring 210 is slid over the pipe 40 after the cap 200. Also, the ring 210 is pushed into position against the hub 20 and along pipe 40 by the protrusion 202 on cap 200 during installation. Otherwise, the ring 210 will distribute adhesive and deform as the protrusion 32 does in the first embodiment.

An optional cut 214 to ring 210 is shown on FIG. 14 and its function will be explained below in the Modifications to the Embodiments section of this description.

Modifications to the Embodiments—FIGS. 13, 14 and 16

FIGS. 13 and 16 show modifications that may be made to either presented embodiment. While they are shown and discussed with reference to the first embodiment, it should be clear to those skilled in the art that applying these modifications to subsequent embodiments would be straightforward.

With certain materials and adhesives, it may be advantageous to adjust the shape of the protrusion. When surfaces meet, the force applied that urges them together may be expressed as a pressure, or force per unit area, that is calculated by dividing the force applied by the area of contact. For some materials, adhesives, and sealants, lower contact pressures and larger surface areas may be acceptable or even preferred. For others, higher contact pressures may be desirable to gain full advantage of the adhesive or sealant. To produce higher pressures, an alternative protrusion 32B, shown on FIG. 13B, may be employed to lower the area of contact which, in turn, increases the contact pressure at the interfaces with the hub 20 and pipe 40. This would be achieved by changing the ruled surface on the protrusion 32, shown on FIG. 13, between the leading edge 33 and the inner-trailing edge 34 to be convex as shown for the protrusion 32B between the leading edge 33B and the inner-trailing edge 34B. Thus, as the protrusion 32B and the pipe 40 meet and deform into one another resulting from the tightening of cap 30, this form would create a high initial contact pressure at the interface of the protrusion 32B and the pipe 40 as only a portion of the surfaces meet, at least initially.

Likewise, a similar modification could also be implemented for the protrusion 32B between the leading edge 33B and the outer-trailing edge 35B creating higher contact pressure between the transition section 22 of the hub 20 and the protrusion 32B. Even with these changes in profile of the protrusion 32B, the protrusion 32B will continue to push applied adhesive 90 into the junction 50 of the hub 20 and the pipe 40 as previously described above. Taken to its logical extent, these convex surfaces could be further rounded to create a protrusion with a circular cross section not unlike an o-ring.

FIG. 13C shows a protrusion 32C with concave surfaces which would also have the affect of increasing contact pressures. In this case, the pressure would be high at the leading edge 33C, the inner-trailing edge 34C, and the outer-trailing edge 35C. This is in contrast to the convex shape previously described where contact pressure would be high between the leading edge 33B and inner-trailing edge 34B and between the leading edge 33B and outer-trailing edge 35B.

FIG. 13D depicts a protrusion 32D where the surface between the leading edge 33D and the inner-trailing edge 34D is broken so that the inner-trailing edge 34D is offset from the bulk of this surface. This modification would allow the protrusion 32D to gather a greater volume of adhesive underneath itself as the protrusion 32D pushes through the adhesive 90 as the fitting 100 is installed.

FIG. 13E describes a protrusion 32E with multiple trailing edges. Shown is a protrusion 32E with a first inner-trailing edge 34E' and a second inner-trailing edge 34E" as well as a first outer-trailing edge 35E' and a second outer-trailing edge 35E". As with the previously described modifications, these trailing edges would be the focus of increased contact pressures.

FIG. 16 shows a modified cap 30F derived from the first embodiment with a breakout detail view of the protrusion 32F. In this first enhancement, one or more small notches 38F are made along the inner-trailing edge 34F on the protrusion 32F. The notches 38F would allow air trapped between the adhesive 90, the protrusion 32F, and the pipe 40 to escape under the inner-trailing edge 33F as the cap 30F is advanced through the adhesive 90 during installation of the fitting 100. This would help ensure that air bubbles are not trapped in the adhesive 53 (shown on FIG. 12B) between the pipe 40 and the protrusion 32F.

The modified cap 30F from FIG. 16 also depicts a second enhancement that would give the protrusion 32F the ability to be deformed to greater degree than if it were solid and with an unbroken leading edge. FIG. 16 shows the modified cap 30F with one or more notches 39F located on the protrusion 32F, with the notches 39F beginning at the leading edge 33F and extending axially and toward the inner-trailing edge 34F. As the protrusion 32F is pushed into the junction 50 of the pipe 40 and the hub 20 during installation, the notches 39F allow the protrusion 32F to more easily collapse and deform to fill the designated space at the junction 50 (shown on FIG. 12A) between the hub 20 and pipe 40.

FIG. 14 depicts the second embodiment with a similar feature and function shown as a single cut 214 on the compression ring 210. Its function is similar to what is described in the prior paragraph. As the ring 210 is pushed into final position, the cut 214 will allow the ring to deform as needed to fill the designated space in the junction 50 between the hub 20 and pipe 40.

UTILITY, APPLICATIONS, AND CONCLUSION

The primary purpose of this disclosure is to describe a way for creating an adhesive-bonded joint for a pipe fitting at any point along the outside surface of a pipe. While there are numerous methods for joining pipes in prior art, on the market, and in relevant industries, none provide the utility described herein. Undoubtedly, each of these methods has their uses. However, each has their particular defects and shortcomings as they relate to the problem of creating an adhesive-bonded joint along the outer surface of a pipe or tube.

A clear application of this invention would be with both polyvinyl chloride (PVC) and acrylonitrile butadiene styrene (ABS) piping systems. Both materials are widely used in the construction industry as materials for water supply and drain lines, particularly in residential buildings. Both of these plastics are typically solvent bonded using an appropriate solvent cement. These systems also utilize pipe where the outer diameter is tightly controlled during manufacture specifically because of how their components are assembled and glued together. Both of these features indicate the suitability of this invention to these piping systems.

The particular suitability of these piping systems for this invention should not infer that the fitting described herein is limited in its ability to be used with other materials, adhesives, or sealants. Other types of plastic piping systems present obvious applications for this invention as do other adhesives or sealants. Though not an exhaustive list, plastics that would be compatible with this invention would also include polyethylene, cross-linked polyethylene, polypropylene, polybutylene, polystyrene, vinyl, polyvinyl chloride, chlorinated polyvinyl chloride, polycarbonate, and acrylonitrile butadiene styrene, including foamed and flexible variations of each of these. Likewise, the list of compatible adhesive and sealants would include but not be limited to solvent cement, polyvinyl chloride solvent cement, chlorinated polyvinyl chloride solvent cement, acrylonitrile butadiene styrene solvent cement, acrylic solvent cement, vinyl solvent cement, contact cement, rubber cement, polyurethane adhesive, epoxy adhesive, acrylic adhesive, silicone adhesive, silicone sealant, petroleum based adhesive, petroleum based sealant, and ultraviolet-light-curable adhesive.

Furthermore, these in no reason why the principles taught herein could not be applied to pipe fittings for metallic pipe. All that is required is a suitable sealing means that can be deformed as described herein, steel, stainless steel, aluminum, copper, lead, and brass being the most obvious choices, along with an adhesive or sealant compatible with the materials used and the service requirements of the fitting. Pipe dope, widely known to and used by plumbing professionals, would clearly be one such sealant. The invention should also be able to be adjusted to work with systems involving a mix of materials. Candidate materials for such systems would surely include metals and plastics as well as rubbers, ceramics, and glasses.

One specific use for this invention would be in constructing a pipe repair coupling, especially one for use with PVC pipe. In a simple form, all that would be needed would be to add a standard pipe socket to the distal end of the hub described in this disclosure, perhaps with a hollow barrel of PVC connecting the two. Such a device could be slipped over one of the broken pipe ends as previously described in this disclosure and slid down the pipe. Next, the socket end of this device would then be aligned with the second broken pipe end. The device could then be pushed back against this second pipe end where the second pipe end would be glued into the socket per typical industry practice. Last, the other end of the device, comprising the pipe fitting described herein, could be applied and bonded to the first pipe as previously described to the exterior of the first pipe. In a second application, the same device with a third fitting at a right angle to the axis of the other fittings, a 'T' fitting, could be made which would allow for the installation of a 'T' at any point along a previously installed pipe. There are currently several devices such of similar function available today, albeit with an inferior means for sealing the fitting to the pipe.

In fact, the pipe fitting described herein could be substituted for a standard pipe socket found on most plastic fittings available at present. Thus, the totality of applications where the utility of this invention may be realized cannot be fully understood at present as this invention offers an additional degree of freedom that current pipe sockets simply do not.

A second specific use may be with iron or steel pipe used for natural gas lines in residential and commercial construction projects. Typically, these joint are threaded and the pipe must be cut exactly to fit. Moreover, serious thought has to go into the order in which the pipes are installed so that all the threaded connections can be made. Thus, a slip joint fitting may be of use here, especially with the repair and modification of these piping systems. However, the outer surface of these pipes are often imperfect and often times coated so typical compression fittings and rubber seals are a not reliable way to make a leak proof joint, which is critical to natural gas lines. An adhesive or sealant-bonded-slip joint fitting as described in this disclosure would be of use here as it would be more tolerant of the imperfections and coatings on the outer surface of the pipe because the adhesive or sealant would fill these defects and bond to the coating to create a robust seal and joint.

The above examples are by no means and exhaustive list of all possible applications for the invention described in this disclosure. It is expected that this novel pipe fitting will prove to have many uses in throughout relevant industries, often as part of larger devices.

While the present invention has been described with reference to presently preferred embodiments, it is to be understood that alterations may be made by a person skilled in the art with departing from the scope and spirit of the invention as set forth in the appended claims.

What is claimed is:

1. A pipe fitting for use with adhesive on a substantially cylindrical pipe, the pipe having inner and outer surfaces of substantially constant respective diameters, the pipe further having at least one accessible end, the pipe fitting being able to be placed at any point along the pipe;
   said pipe fitting comprising:
   a. a hub extending along an axis, the first end having an inner bore similar to said outer pipe diameter, a tapered transition section between first and second ends, and a second end having an inner diameter larger than said outer pipe diameter by a predetermined amount;
   b. a cap extending along a second axis, having an inner bore similar to said outer pipe diameter;
   c. a sealing means, having a leading edge with a diameter larger than said outer pipe diameter by a predetermined amount, and at least one inner-trailing edge with a diameter similar to said outer pipe diameter;
   d. an attachment means for mounting said cap onto said hub, having at least one substantially helical rib on said cap and/or said hub;
   whereby said cap is adapted to mount to said hub via said attachment means, thereby urging said sealing means into position against said pipe and said hub.

2. A pipe fitting for a substantially cylindrical pipe, the pipe extending along a first axis and having inner and outer surfaces of substantially constant respective diameters, the pipe further having at least one accessible end, the pipe fitting being able to be placed at any point along the pipe;
   said pipe fitting comprising:
   a hub extending along a second axis, the first end having an inner bore of diameter similar to said outer pipe diameter, a tapered transition section between first and second ends, and a second end having an inner diameter larger than said outer pipe diameter by a predetermined amount, and at least one substantially helical rib disposed about and along said second axis;
   a cap extending along a third axis, the inner bore having a protrusion about and along said third axis, said protrusion having a leading edge with a diameter larger than said outer pipe diameter by a predetermined amount, and at least one inner-trailing edge with a diameter similar to said outer pipe diameter, with said cap having at least one substantially helical rib disposed about and along said third axis;
   whereby said cap is adapted to mount to said hub via engagement of said helical ribs on said cap and said helical ribs on said hub, thereby urging said protrusion of said cap against said tapered section of said hub thus deforming said leading edge of said protrusion radially inward.

3. The pipe fitting of claim 2, wherein said hub and said cap are substantially composed of plastic.

4. The pipe fitting of claim 2, wherein said hub and said cap are substantially composed of material selected from the group consisting of polyethylene, cross-linked polyethylene, polypropylene, polybutylene, polystyrene, vinyl, polyvinyl chloride, chlorinated polyvinyl chloride, polycarbonate, and acrylonitrile butadiene styrene.

5. The pipe fitting of claim 2, wherein said protrusion has at least one notch on said inner-trailing edge of said protrusion.

6. The pipe fitting of claim 2, wherein said protrusion has at least one notch or cut on said leading edge of said protrusion.

7. The pipe fitting of claim 2, wherein the angle of said protrusion at said leading edge is similar to the angle between said pipe and said tapered section of said hub.

8. The pipe fitting of claim 2, wherein said protrusion has at least one outer-trailing edge with a diameter larger than the diameter of said leading edge.

9. The pipe fitting of claim 2, wherein said protrusion has a section reduced in thickness proximal to said inner-trailing edge.

10. The pipe fitting of claim 2, wherein said protrusion has a substantially bulbous shape.

11. A pipe fitting for use with adhesive on a substantially cylindrical pipe, the pipe extending along a first axis and having inner and outer surfaces of substantially constant respective diameters, the pipe further having at least one accessible end, the pipe fitting being able to be placed at any point along the pipe;
    said pipe fitting comprising:
    a hub extending along a second axis, the first end having an inner bore of diameter similar to said outer pipe diameter, a tapered transition section between first and second ends, and a second end having an inner diameter larger than said outer pipe diameter by a predetermined amount, and at least one substantially helical rib disposed about and along said second axis;
    a cap extending along a third axis, the inner bore having a protrusion about and along said third axis, said protrusion having a leading edge with a diameter larger than said outer pipe diameter by a predetermined amount, and at least one inner-trailing edge with a diameter similar to said outer pipe diameter, with said cap having at least one substantially helical rib disposed about and along said third axis;

whereby said cap and said hub are slid over said open end of said pipe, and said adhesive applied to said hub and said pipe around and along the junction of said tapered section of said hub and said pipe;

whereby said cap is urged along said pipe to contact said hub, thereby urging said adhesive into the gap between said protrusion and said pipe;

whereby said cap is adapted to mount to said hub via engagement of said helical ribs on said cap and said helical ribs on said hub, thereby urging said protrusion of said cap against said tapered section of said hub thus deforming said leading edge of said protrusion radially inward and against said pipe, sandwiching said adhesive between said pipe and said protrusion and between said hub and said protrusion.

12. The pipe fitting of claim 11, wherein said hub and said cap are substantially composed of plastic.

13. The pipe fitting of claim 11, wherein said hub and said cap are substantially composed of material selected from the group consisting of polyethylene, cross-linked polyethylene, polypropylene, polybutylene, polystyrene, vinyl, polyvinyl chloride, chlorinated polyvinyl chloride, polycarbonate, and acrylonitrile butadiene styrene.

14. The pipe fitting of claim 11, wherein said protrusion has at least one notch on said inner-trailing edge of said protrusion.

15. The pipe fitting of claim 11, wherein said protrusion has at least one notch or cut on said leading edge of said protrusion.

16. The pipe fitting of claim 11, wherein the angle of said protrusion at said leading edge is similar to the angle between said pipe and said tapered section of said hub.

17. The pipe fitting of claim 11, wherein said protrusion has at least one outer-trailing edge with a diameter larger than the diameter of said leading edge.

18. The pipe fitting of claim 11, wherein said protrusion has a section reduced in thickness proximal to said inner-trailing edge.

19. The pipe fitting of claim 11, wherein said protrusion has a substantially bulbous shape.

20. The pipe fitting of claim 11, wherein said adhesive is substantially composed of material selected from the group consisting of solvent cement, polyvinyl chloride solvent cement, chlorinated polyvinyl chloride solvent cement, acrylonitrile butadiene styrene solvent cement, acrylic solvent cement, vinyl solvent cement, contact cement, rubber cement, polyurethane adhesive, epoxy adhesive, acrylic adhesive, silicone adhesive, silicone sealant, petroleum based adhesive, petroleum based sealant, and ultraviolet light curable adhesive.

21. A pipe fitting for use with adhesive on a substantially cylindrical pipe, the pipe having inner and outer surfaces of substantially constant respective diameters, the pipe further having at least one accessible end, the pipe fitting being able to be placed at any point along the pipe;

said pipe fitting comprising:
  a. a hub extending along an axis, the first end having an inner bore similar to said outer pipe diameter, a tapered transition section between first and second ends, and a second end having an inner diameter larger than said outer pipe diameter by a predetermined amount;
  b. a cap extending along a second axis, having an inner bore similar to said outer pipe diameter;
  c. a sealing means for sandwiching said adhesive between said sealing means and said pipe, and between said sealing means and said hub;
  d. an attachment means for mounting said cap onto said hub, having at least one substantially helical rib on said cap and/or said hub;

whereby said cap is adapted to mount to said hub via said attachment means, thereby urging said sealing means into position against said pipe and said hub.

* * * * *

UNITED STATES PATENT AND TRADEMARK OFFICE
CERTIFICATE OF CORRECTION

| | | |
|---|---|---|
| PATENT NO. | : 12,111,003 B2 | Page 1 of 1 |
| APPLICATION NO. | : 17/942152 | |
| DATED | : October 8, 2024 | |
| INVENTOR(S) | : Martin Jay Padget | |

It is certified that error appears in the above-identified patent and that said Letters Patent is hereby corrected as shown below:

In the Specification

Column 9, Line 32. The word 'with' should be 'without'.

Signed and Sealed this
First Day of April, 2025

Coke Morgan Stewart
*Acting Director of the United States Patent and Trademark Office*